Jan. 7, 1947.     K. F. SENTIVANY     2,414,067
TIRE TRACTION DEVICE
Filed Nov. 15, 1943

INVENTOR.
KALMAN F. SENTIVANY.
BY
Louis V. Lucia
ATTORNEY.

Patented Jan. 7, 1947

2,414,067

UNITED STATES PATENT OFFICE 2,414,067

TIRE TRACTION DEVICE

Kalman F. Sentivany, Hartford, Conn.

Application November 15, 1943, Serial No. 510,282

3 Claims. (Cl. 152—245)

This invention relates to tire traction devices, such as anti-skid chains commonly used on tires of vehicles.

An object of this invention is to provide such a device which is suitable for use in mud, sand, snow, or under other similar conditions, for providing sufficient traction to drive the vehicle.

A further object of the invention is the provision of such a device which will prevent skidding and which will also eliminate excessive vibration when the device is used over hard pavements.

Further objects and advantages of the invention will be more clearly understood from the following description and from the accompanying drawing in which.

Figure 1:
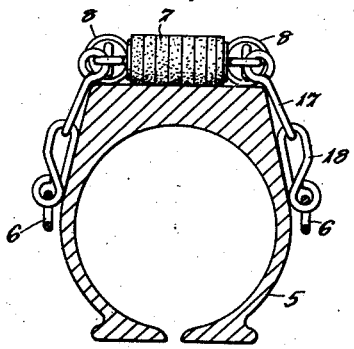
Fig. 1 is an end view, in central vertical section on line 1—1 of Fig. 2, showing the device attached to a vehicle tire.
Figure 2:
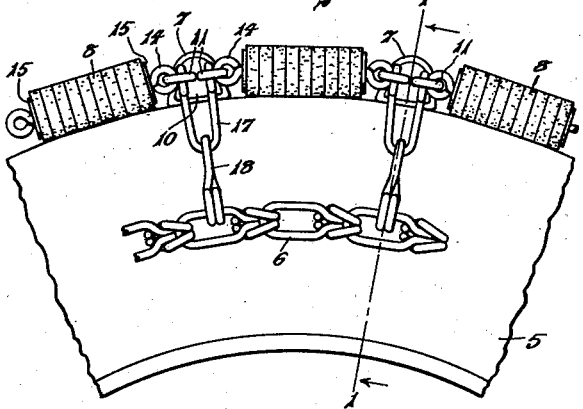
Fig. 2 is an elevational side view of a portion of the device.
Figure 4:
Fig. 4 is an elevational side view showing one of the side chain hooks used in the device.

As shown in the drawing, the numeral 5 denotes a vehicle tire of common construction on which my improved traction device may be used. Said traction device comprises side chains 6—6, of conventional construction, by which the device is attached to the tire.

Figure 5:
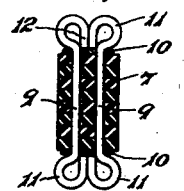
Fig. 5 is a plan view, in horizontal section, of a cross member taken on line 5—5 of Fig. 6.

A plurality of spaced cross members 7 and longitudinal members 8 are secured together to form a chain fitting around and against the tread of the tire. Each of these members is preferably of laminated construction consisting of a plurality of washers which are cut from a suitable material, such as rubber covered with canvas or other similar resilient material. The said washers in each of the members 7 are secured together by means of a pair of wires 9—9 which extend longitudinally through spaced openings in the washers. At the opposite ends of the members, I provide clamping plates 10—10 which are forced against the ends of the members by means of loops 11—11 in each of said wires. These loops are bent outwardly and then inwardly with their ends preferably adjacent to the surfaces of the said washers 10—10 as indicated at 12 in Fig. 5. It will be noted that the said loops 11 provide shoulders, at the outwardly extending portions thereof, which serve to clamp the plates 10—10 against the washers in the laminated body of the member 7.

The said cross members are preferably flat and of a greater width at the bottom thereof in order to prevent their rotation on the surface of the tire while in use.

Figure 6:
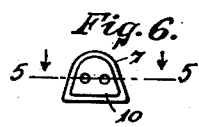
Fig. 6 is an end view of the same.
Figure 7:
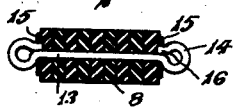
Fig. 7 is a plan view, in central horizontal section, of one of the longitudinal members, showing a modified form of loop therein.

The longitudinal members 8 are also constructed with laminations of washers similar to those used in the cross members 7. The washers in said longitudinal members, however, are secured by a single wire 13 having loops 14 at its ends clamping the plates 15 against the laminations. In the form shown in Fig. 6, the ends of the loops are extended through the clamping plates, as clearly indicated at 16, in order to prevent opening of the loops by an excessive pull.

Figure 3:
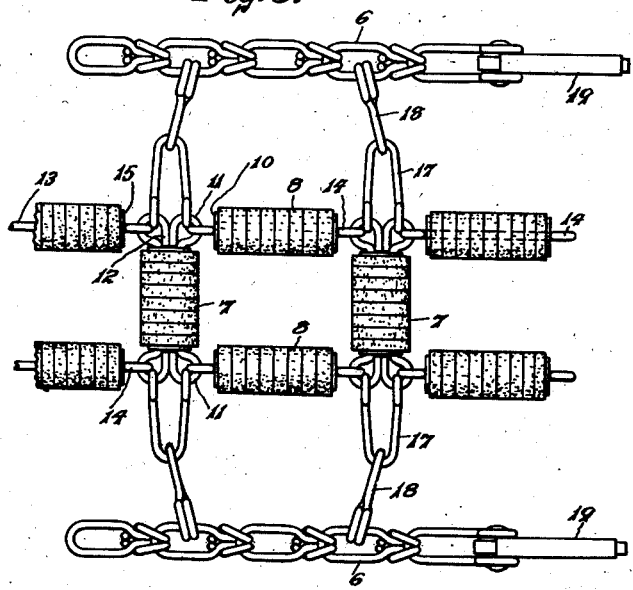
Fig. 3 is an elevational plan view showing a portion of the device in flat position.

As clearly shown in Fig. 3, it will be noted that the loops 11 of the cross members receive the loops 14 of the longitudinal members and also the connecting links 17 and 18 which connect the tread chain, consisting of the cross members 7 and the parallel rows of the longitudinal members 8, to the side chains 6—6.

The said side chains are connected together in a conventional manner by the use of the hooks, as indicated at 19. It is intended that the side chain fitting on the inside of the tire shall be separated into four sections and provided with four of these hooks while the outside chain member will be provided with only one. This will provide for easily detaching the device from the tire by simply disconnecting the four inside hooks and pulling the device outwardly off the tire.

I claim:

1. In a traction device of the character described, a cross member comprising an elongated body consisting of a plurality of resilient washers forming laminations in said body, a pair of spaced wires extending through said laminations, a plate at the opposite ends of said body, loops on said wires bent in opposite directions and retaining said plates in position to clamp said laminations therebetween, longitudinal members extending between said cross members and connected at each end thereof to said loops, a pair of side chains for securing said cross members to the tire, and means connecting said cross-members to said side chains.

2. In a traction device of the character described, a cross member adapted to extend across the tread of a vehicle tire; the said member including a body portion which is rounded at one side thereof and substantially flat at the opposite side; the said body portion being constructed of a plurality of laminations of wear-resisting material, a plate at each end of said body portion, a pair of spaced wires extending through said body portion, and loops at the ends of said wires for clamping said laminations between said plates.

3. In a traction device of the character described, a plurality of longitudinal members each consisting of a body portion formed of a plurality of laminations of wear-resisting flexible material, a plate at each end of said body portion, a wire extending through said laminations and plates and having loops at the opposite ends thereof abutting said plates to thereby clamp said laminations therebetween, each of the looped portions of said wire having the end thereof extending into an opening in the end plate to prevent opening of said loop.

KALMAN F. SENTIVANY.